M. HIMBERGER.
AUTOMATIC CAR COUPLING WITH AIR OPERATED RELEASE.
APPLICATION FILED APR. 24, 1914.
1,108,577.
Patented Aug. 25, 1914.
4 SHEETS—SHEET 1.
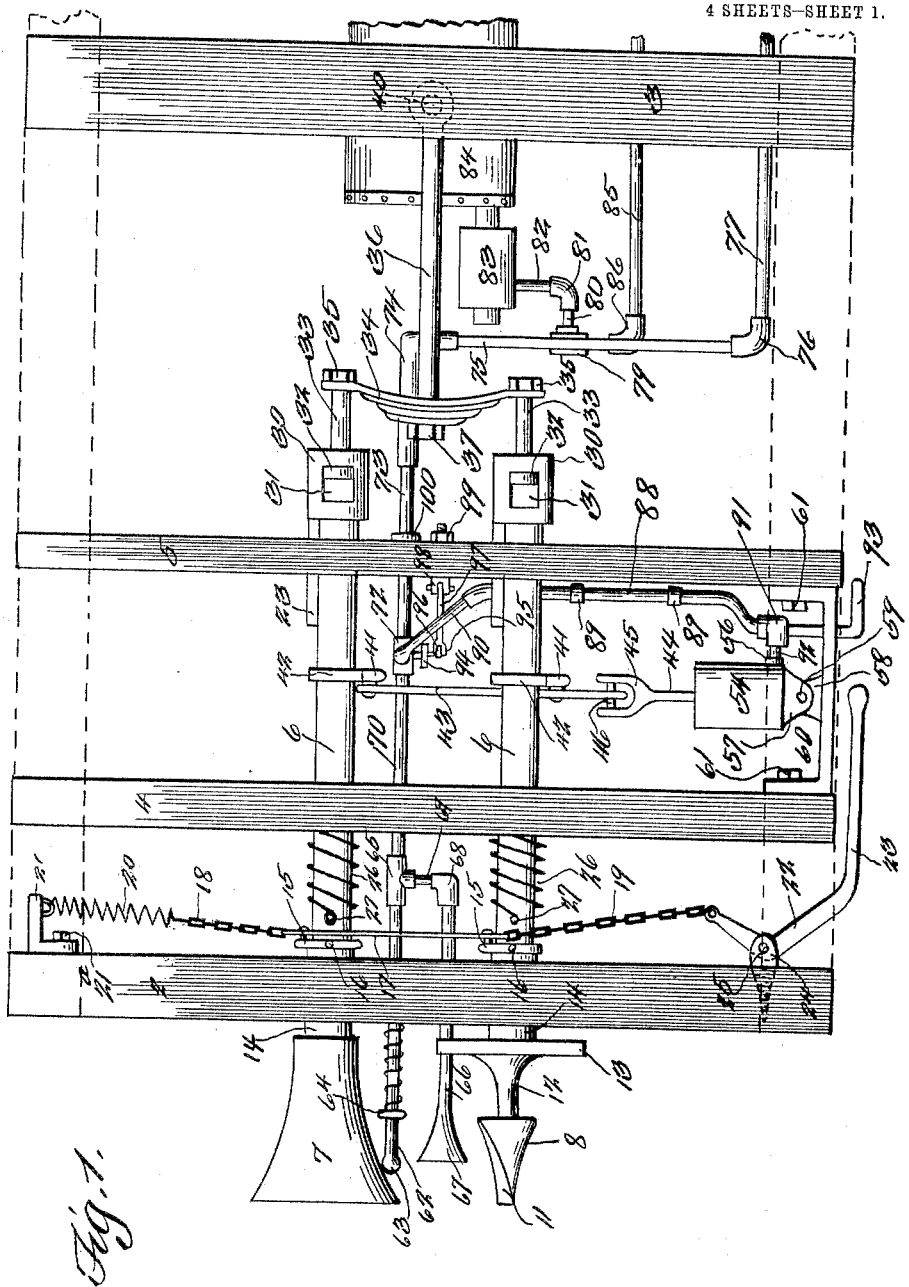

M. HIMBERGER.
AUTOMATIC CAR COUPLING WITH AIR OPERATED RELEASE.
APPLICATION FILED APR. 24, 1914.
1,108,577.
Patented Aug. 25, 1914.
4 SHEETS—SHEET 2.
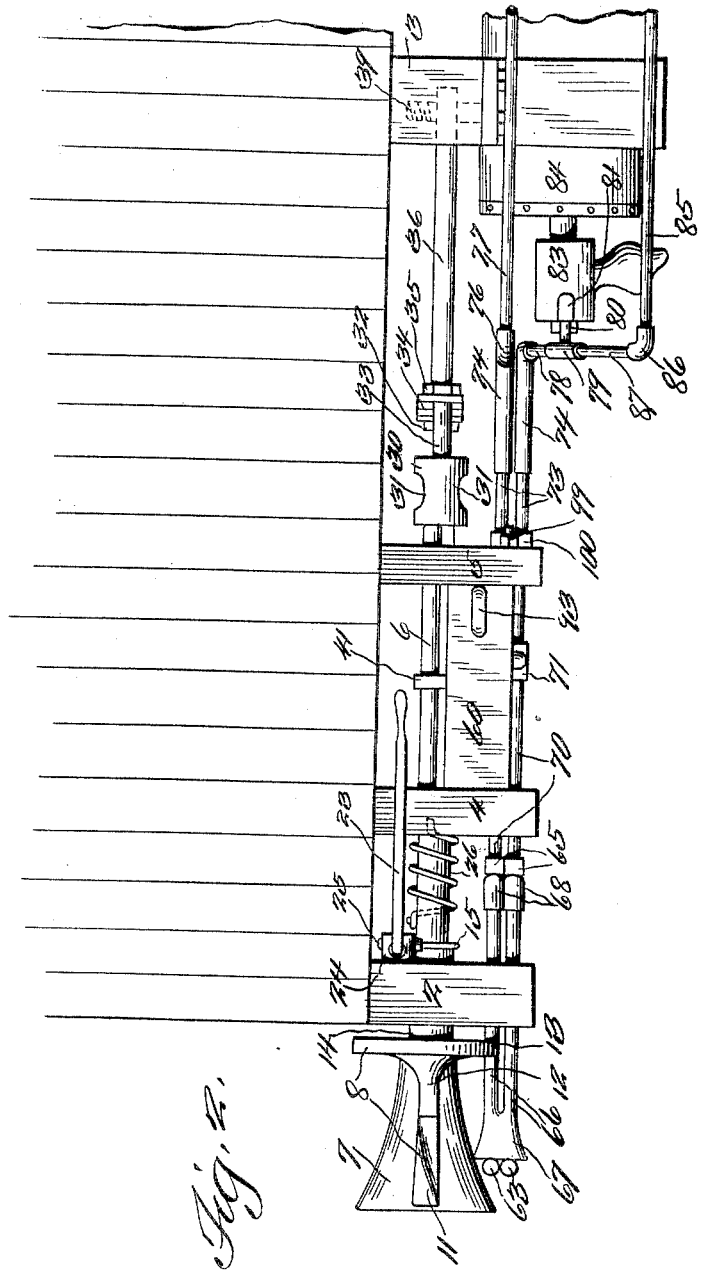
Witnesses
A. R. Wolfe,
Inventor
Matt Himberger,
By D. Swift &c.,
his Attorneys M. HIMBERGER.
AUTOMATIC CAR COUPLING WITH AIR OPERATED RELEASE.
APPLICATION FILED APR. 24, 1914.
1,108,577.
Patented Aug. 25, 1914.
4 SHEETS—SHEET 3.
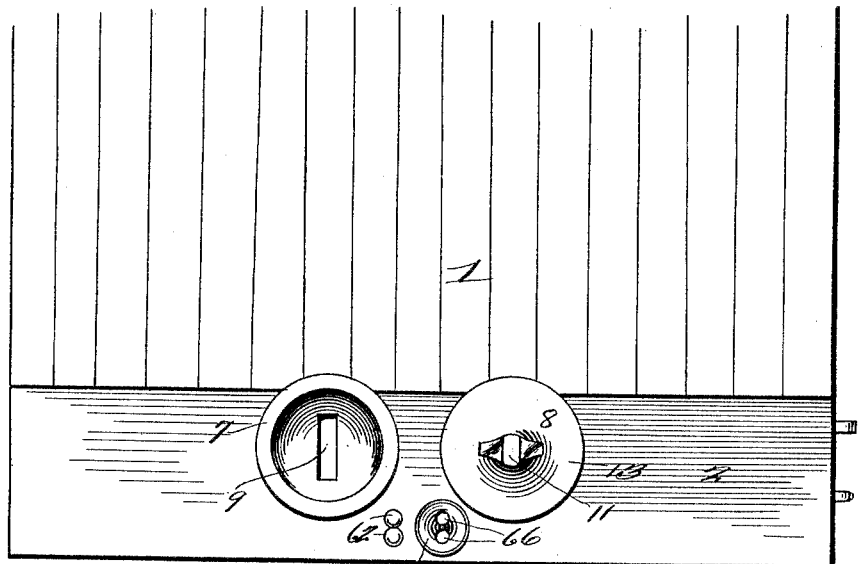
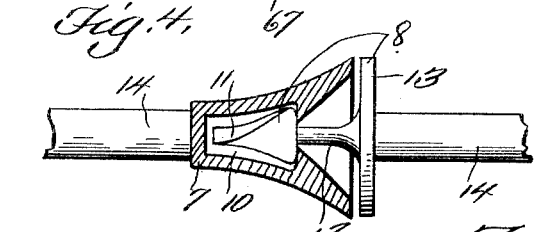
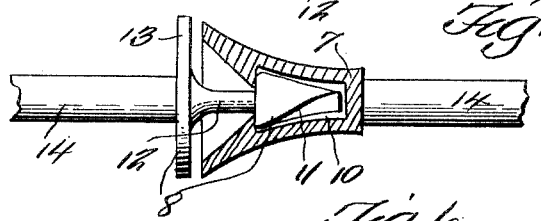
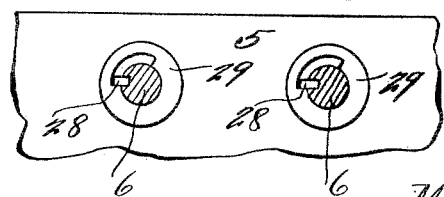
Witnesses
A. R. Wolfe,
Francis F. Boswell,
Inventor
Matt Himberger,
By D. Swift & C.
his Attorneys M. HIMBERGER.
AUTOMATIC CAR COUPLING WITH AIR OPERATED RELEASE.
APPLICATION FILED APR. 24, 1914.
1,108,577.
Patented Aug. 25, 1914.
4 SHEETS—SHEET 4.
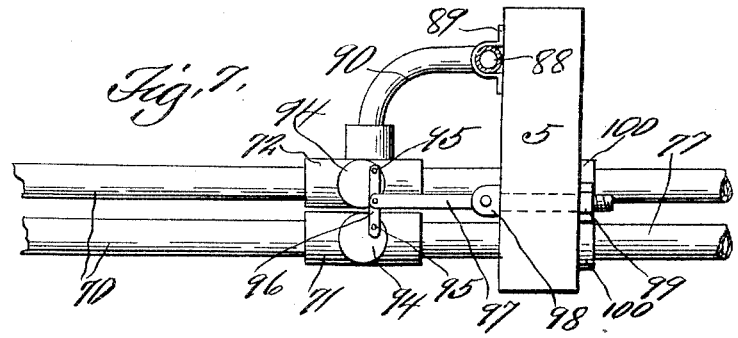
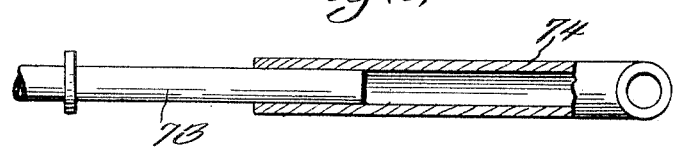
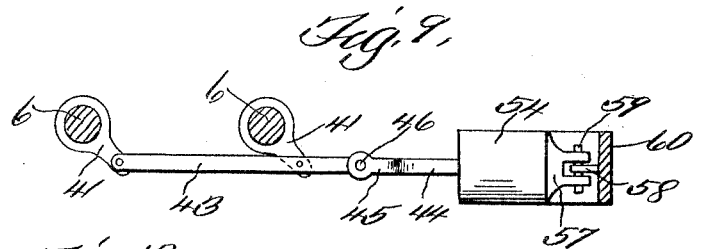
Inventor
Matt Himberger,
By D. Swift &c.,
his Attorneys
Witnesses
A. R. Wolfe
Francis G. Boswell

UNITED STATES PATENT OFFICE.

MATT HIMBERGER, OF WOODWARD, IOWA.

AUTOMATIC CAR-COUPLING WITH AIR-OPERATED RELEASE.

1,108,577. Specification of Letters Patent. Patented Aug. 25, 1914.

Application filed April 24, 1914. Serial No. 834,240.

*To all whom it may concern:*

Be it known that I, MATT HIMBERGER, a citizen of the United States, residing at Woodward, in the county of Dallas and State of Iowa, have invented a new and useful Automatic Car-Coupler with Air-Operated Release; and I do hereby declared the following to be a full, clear, and exact description of the invention, such as will enable others skilled in the art to which it appertains to make and use the same.

This invention belongs to the class of automatic car couplers generally and is particularly a coupler with an air operated release.

The principal aim of the invention is to preclude the necessity for trainmen having to go between cars for any reason during the coupling and uncoupling operations and to that end the invention provides automatic coupling devices for connecting the air mechanisms of individual cars.

The specific structure herewith illustrated is thought at present to be the best.
The inventor, however, reserves the right to vary the design of this structure to suit requirements, so long as variations are within the spirit of the subjoined claims.

In the drawings:—Figure 1 is a plan showing the invention attached to the under frame of a car. The car body is omitted in this figure. Fig. 2 is a longitudinal elevation. Fig. 3 is a front elevation. Fig. 4 is a plan of two couplers connected. Part of this figure is shown in section for the purpose of bringing out clearly the interior shape of the female coupling member. Fig. 5 is a view similar to Fig. 4, showing the other couplers of the mating cars. Fig. 6 is a transverse sectional view of the coupler shanks taken just in front of the strengthening sill 5. Fig. 7 is an enlarged elevation of that portion of the air pipes containing the automatically operated valves. Fig. 8 is a longitudinal sectional view of the telescopical portions of the air pipes. Fig. 9 is a detail view showing the cranks 41 of the shanks 6 connected by the rod or bar 43, which is operated by the coupler release cylinder. Fig. 10 is a longitudinal sectional view through the release cylinder. Fig. 11 is a detail view in section of the rear end of one of the shanks showing one of the hollow caps 30 and one of the bolts 33. Fig. 12 is a detail view of one of the twin pipes 62, showing the globular head 63 in section.

Fig. 13 is an end elevation of the coupler release cylinder.

The car body 1 is provided with the end sill 2 and the draft bar 3 and has intermediate strengthening sills 4 and 5. The twin coupling shanks 6 have bearings in the sills 2, 4 and 5 and at the forward end one is provided with the female coupler 7 while the other carries the male coupler 8.

The coupler 7 is funnel-shaped with a rectangular opening 9 leading into a chamber 10 formed in the body. The male coupler 8 has a skewed nose 11 of the shape shown in Figs. 1, 2, 3 and 4 and this nose is at the end of a neck 12 which emanates from the meeting plate 13. Couplers 7 and 8 are integral with the shouldered portions 14 of their respective shanks 6. Just back of these shouldered portions, the cranks 15 are fastened to the shanks 6 by means of pins 16. These cranks are connected together by the link 17 to opposite ends of which the chains 18 and 19 are secured. Chain 18 then connects with the spring 20 which is attached to the angle plate 21, this plate being held on the end sill 2 by the cup screw 21$^a$. Chain 19 connects the link 17 with one end of the bell-crank lever 22, a handle 23 being provided at the free end of this lever. A bifurcated piece 24 (secured to the sill 2 by means of its tang which is shaped like a wood screw) serves as a support for lever 22, the pin 25 permitting a rocking motion of said lever.

It will be seen that the object of this lever is to permit cars to be uncoupled by a manual operation in case of failure of the automatic device. The spring 20 is to keep all slack out of the chains 18 and 19 and to keep the handle 23 normally close to the car body, in addition to aiding in keeping the coupling members in their normal position.

To the rear of cranks 15 spiral springs 26 encircle the shanks 6, the front ends bending around the pins 27 and the rear ends entering holes formed in the strengthening sill 4. These springs 26 perform a cushioning function in the coupling operation and offer a resilient resistance to the turning of the shanks 6, which turning is necessary when the couplings of adjacent cars engage. At the rear end of shanks 6 keys 28 are provided and the shanks have a bearing at this point in sill 5, bearings 29 being provided for the purpose. These bearings are recessed a quarter of their internal circumference so as to permit the shanks 6 to turn a quarter of a revolution. At the extreme rear, the shanks 6 have the hollow caps 30 screwed on (Fig. 11) and these caps have diametrically opposite openings 31. They receive the heads 32 of the bolts 33, which project through holes in the end of the caps. Bolts 33 are secured to the opposite ends of leaf spring 34 by nuts 35 and this leaf spring has penetrating its center the draft rod 36 to which it is secured by the nut 37. Rod 36 enters a recess in the draft bar 38, wherein it is held by the cap screw 39, which passes through its eye 40.

The cranks 41 connected rigidly to the shanks 6 by means of the pins 42 are joined together by the connecting rod 43. The piston rod 44 connects with rod 43 at its forked end 45 by means of the pin 46 and entering the cylinder connects with the piston 47, the shoulder 48 and nut 49 acting as the fastening means. The piston has a check valve 50 which seats in the taper hole 51, the stem 52 of this valve connecting with the cross piece 53 to keep the valve from falling out. The object of this valve will be disclosed later.

The cylinder is composed of the outer casing 54 and the end cap 55 which is screwed into the outer casing. An air inlet 56 is provided at the rear of the casing and the extreme rear end is formed into the bifurcated piece 57 by which it is fastened to the projection 58 by means of the pin 59.

Channel iron 60 of which 58 is an integral part supports the release cylinder on the under framing of the car and is secured to the sills 4 and 5 by the cup-screws 61.

As the principal object of this invention would be defeated if it did not contemplate the automatic coupling of the air mechanism, a device for accomplishing this result is included in the design.

Twin pipes 62 with globular heads 63 and collars 64 pass through the end sill 2 and connect to T's 65. These globular heads have circular openings 66a. Parallel to 62 are pipes 66 which terminate at their front ends in the funnel-shaped mouth 67 and at their rear ends in the elbows 68. Pipes 66 are held rigidly in end sill 2 but pipes 62 are capable of a sliding movement therein. Flexible tubing 69 connects the elbows 68 with T's 65. Pipes 70 join T's 65 with the valve 71 and the three way valve 72, and pipes 73 connect these valves with the telescopic elbows 74. From one elbow 74a, pipe 75 enters an elbow 76 from which a pipe 77 runs to equivalent mechanism at the other end of the car. From the other elbow 74, a pipe 78 communicates by means of the T 79, the nipple 80, the elbow 81 and the nipple 82 with the triple valve 83 and through this triple valve with the auxiliary reservoir 84. Pipe 85 runs to the other end of the car but connects with the T 79 through the elbow 86 and nipple 87.

Auxiliary reservoir 84 and triple valve 83 are merely shown here as properly belonging to the car's air mechanism but as they form no part of the present invention their specific construction will not be entered into.

To the sill 5 a pipe 88 is fastened by straps 8° and this pipe connects with the three-way valve 72 by the flexible tube 90. The angle valve 91 is joined to the pipe 88 and admits air to the release cylinder through the flexible nipple 92. A handle 93 for the manual operation of the valve projects through the channel iron 60.

On the stems of valves 71 and 72 are disks 94 provided with pins 95 which receive the link 96 and at the middle of this link another link 97 is joined. Link 97 connects with the bifurcated piece 98 which is fastened to the sill 5 by the nut 99.

Pipes 73 are provided with collars 100 which abut the sill 5 and these pipes with all the equipment between them and the pipes 62 and including 62 form a rigid device capable of sliding in the sills by which they are supported. Collars 100 limit the movement of the whole forward and a movement backward is provided by the resilience of the springs 101 and the sliding of the pipes 73 in the telescopic elbows 74.

The plan of a double coupling as here shown is at first sight paradoxial, but when it is remembered that the actual coupling operation is between a male and female member, the necessity of one of each kind to a car is apparent if cars are to be indiscriminately coupled.

When the couplings on adjacent cars engage, the noses 11 of the male members 8 worm themselves through the openings 9 of the female members into the chambers 10. In order to do this it is necessary that the shanks 6 turn a quarter of a revolution and they do so against the torsion of the springs 26. When the noses 11 are completely in the chambers 10 the springs 26 return the shanks 6 to their normal position.

As the shanks 6 are rocked, the piston 47 is pulled out by the cranks 42 and this would act as a damper on the turning of the shanks were it not for the peculiar construction of the release cylinder. The cap 55 being provided with openings allows the piston to exclude the air in front of it and the check valve 50 prevents the formation of a partial vacuum behind it. The piston thus is permitted a free movement while the couplings are engaging and when they are ready to resume their normal position it acts as a cushion to the sudden action of the springs 26.

With the air couplings female members engage opposing male members, the resilient male member yielding to the pressure of the rigid female member. This movement of the male member results in the opening of the valves 71 and 72, 71 admitting air to the braking system and 72 (being a three-way valve) admitting air to the pipe 88 and opening the way for its transmission to other cars.

When air is present in the pipe 88 the opening of the valve 91 by the handle 93 admits it to the cylinder 59. The air then being behind the piston keeps the check valve 50 closed and forces the piston out, thus rocking the cranks 41 and turning the shanks 6 a quarter of a revolution when the couplings may be disengaged.

The invention having been set forth, what is claimed as new and useful is:—

1. In an automatic car coupling, twin shanks attached to the under framing of a car, a female coupling member on the free end of one shank, a male coupling member on the free end of the other shank, keys at the rear ends of said shanks which limit their rotation to one quarter of a revolution, springs for holding said shanks with their attendant couplings in their normal positions, cranks on said shanks, a swinging air cylinder attached to the car body a piston in the cylinder, a rod connecting the piston and the cranks by which the piston may rotate the shanks through one quarter of a revolution.

2. In an automatic car coupling, twin coupler shanks mounted in the under framing of a car, a female coupling member on the free end of one shank, a male coupling member on the free end of the other shank, means at the rear end of said shanks for limiting their rotation to one quarter of a revolution, resilient means for holding said shanks with their attending couplings in their normal positions, cranks on said shanks, a rod connecting said cranks whereby they may be partially rocked synchronously, pivotally mounted pneumatic means having connections with said rod for automatically actuating the same, and spring tensioned means having connections with said shanks and including a lever for manually rotating said shanks partially.

In testimony whereof I have signed my name to this specification in the presence of two subscribing witnesses.

MATT HIMBERGER.

Witnesses:
HERMAN FISHER,
JOHN GEIGLIONE.

---

Copies of this patent may be obtained for five cents each, by addressing the "Commissioner of Patents, Washington, D. C."